(12) United States Patent  
Yetukuri et al.

(10) Patent No.: US 8,807,653 B2  
(45) Date of Patent: Aug. 19, 2014

(54) ADJUSTABLE HEAD RESTRAINT ASSEMBLY FOR VEHICLE SEATS

(75) Inventors: Arjun V. Yetukuri, Rochester Hills, MI (US); Gerald S. Locke, Lake Orion, MI (US); Scott Andrew Willard, Rochester, MI (US)

(73) Assignee: Lear Corporation, Southfield, MI (US)

( * ) Notice: Subject to any disclaimer, the term of this patent is extended or adjusted under 35 U.S.C. 154(b) by 531 days.

(21) Appl. No.: 12/884,895

(22) Filed: Sep. 17, 2010

(65) Prior Publication Data

US 2012/0068517 A1 Mar. 22, 2012

(51) Int. Cl.
*A47C 1/10* (2006.01)
*B60N 2/48* (2006.01)

(52) U.S. Cl.
CPC ............ *B60N 2/4847* (2013.01); *B60N 2/4844* (2013.01)
USPC .......................................... 297/408; 297/410

(58) Field of Classification Search
USPC ................................................. 297/408, 410
See application file for complete search history.

(56) References Cited

U.S. PATENT DOCUMENTS

| 5,669,668 | A | 9/1997 | Leuchtmann | |
|---|---|---|---|---|
| 6,302,485 | B1 * | 10/2001 | Nakane et al. | 297/408 |
| 6,899,395 | B2 | 5/2005 | Yetukuri et al. | |
| 6,910,740 | B2 * | 6/2005 | Baker et al. | 297/408 |
| 7,431,400 | B2 * | 10/2008 | Brawner | 297/408 |
| 7,717,517 | B2 * | 5/2010 | Yamane et al. | 297/408 |
| 8,157,328 | B2 * | 4/2012 | Brunner et al. | 297/408 |
| 8,231,177 | B2 * | 7/2012 | Jammalamadaka et al. | 297/408 |
| 8,303,038 | B2 * | 11/2012 | Smith | 297/408 |

| 2007/0284929 | A1 | 12/2007 | Keller et al. | |
|---|---|---|---|---|
| 2008/0036263 | A1 | 2/2008 | Little | |
| 2008/0203801 | A1 * | 8/2008 | Jammalamadaka et al. | 297/408 |
| 2010/0019559 | A1 | 1/2010 | Smith | |
| 2010/0072791 | A1 | 3/2010 | Brunner et al. | |
| 2010/0078984 | A1 | 4/2010 | Jammalamadaka et al. | |

FOREIGN PATENT DOCUMENTS

| DE | 1780615 | 2/1972 |
|---|---|---|
| DE | 2525040 A1 | 12/1976 |
| DE | 102004044970 A1 | 6/2005 |
| DE | 102006027646 A1 | 12/2007 |
| KR | 1020090047671 | 5/2009 |

OTHER PUBLICATIONS

German Office Action for corresponding German Application No. 10 2011 082 557.6, mailed, Oct. 30, 2012, 12 pages.
U.S. Appl. No. 12/436,336, filed May 6, 2009, 30 pages.
Chinese Office Action for corresponding Application No. 201110268833.2, mailed Oct. 10, 2013, 7 pages.

* cited by examiner

*Primary Examiner* — Laurie Cranmer
(74) *Attorney, Agent, or Firm* — Brooks Kushman P.C.

(57) ABSTRACT

An adjustable vehicle head restraint assembly is provided with a post mounted in a vehicle proximate to a seat back. A transverse shaft is mounted to the post. A head restraint is pivotally connected to the shaft. A series of teeth are provided on the head restraint. A locking mechanism is mounted to the shaft for translation in a transverse direction for engagement with the teeth. An actuator cooperates with the locking mechanism for disengaging the mechanism from the series of teeth for permitting adjustment of a tilt of the head restraint. A head restraint assembly is provided with a partial ring gear mounted to the head restraint. A sector gear is mounted to a transverse shaft in engagement with the partial ring gear. The actuator translates one of the partial ring gear and the sector gear for disengaging the gears and permitting adjustment of the tilt.

17 Claims, 4 Drawing Sheets

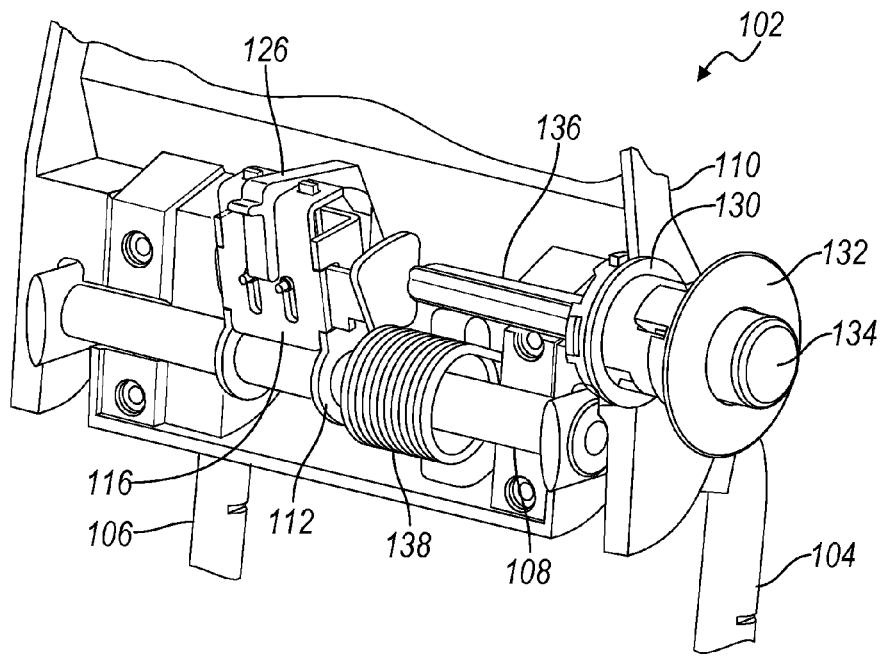
FIG. 6
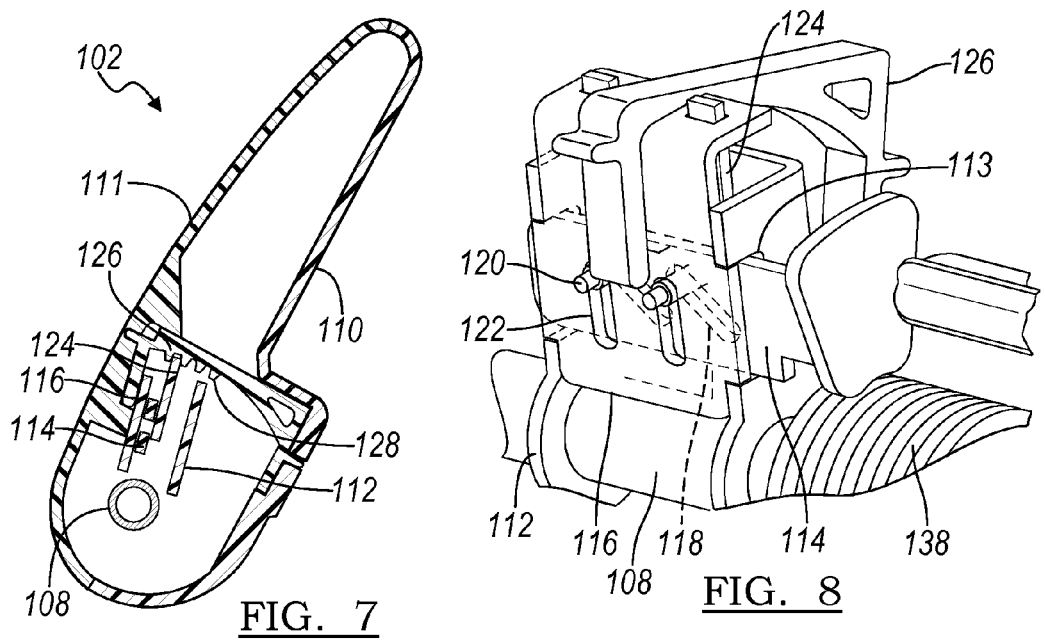
FIG. 7
FIG. 8

ADJUSTABLE HEAD RESTRAINT ASSEMBLY FOR VEHICLE SEATS

TECHNICAL FIELD

Various embodiments relate to adjustable vehicle head restraint assemblies.

BACKGROUND

Vehicle seats are often provided with movable head restraints, which can move to accommodate a head of an occupant and/or can move to various stowed positions to provide a compact seat in a stowed position. One example of a vehicle seat having a movable head restraint is disclosed in U.S. Pat. No. 6,899,395 B2, which issued on May 31, 2005 to Yetukuri et al.

BRIEF DESCRIPTION OF THE DRAWINGS

FIG. 6 is a partially disassembled perspective view of an adjustable vehicle head restraint assembly according to another embodiment;

FIG. 7 is a section view of the head restraint assembly of FIG. 6;

FIG. 8 is an enlarged perspective view of a portion of the head restraint assembly of FIG. 6;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
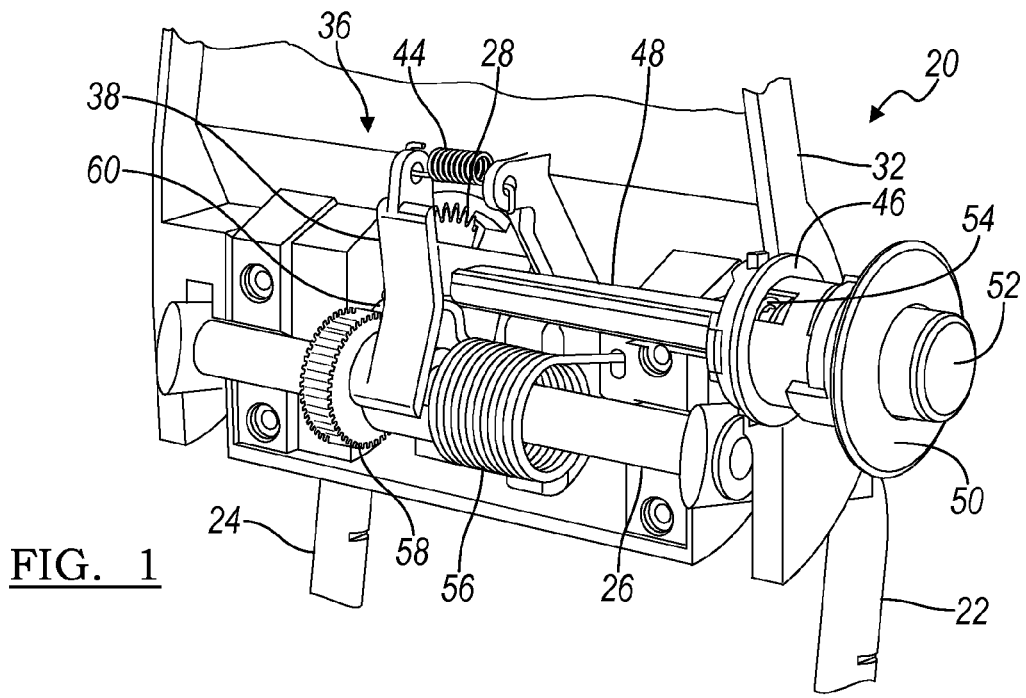
FIG. 1 is a partially disassembled perspective view of an adjustable vehicle head restraint assembly according to an embodiment.

With reference now to FIG. 1, an adjustable vehicle head restraint assembly is illustrated and referenced generally by numeral 20. The head restraint assembly 20 may be mounted in a vehicle proximate to a seat back for use in the vehicle, such as an automobile, a boat or an airplane. The head restraint assembly 20 may be mounted directly to the vehicle seat back, or may be mounted to the vehicle body. The head restraint assembly 20 may be utilized with any style seat, such as a first row seat, a second row seat, a third row seat, or the like. Likewise, the head restraint assembly 20 may be employed with a sports car seat, a single passenger seat, a captain's chair, a bench seat, or the like.

The head restraint assembly 20 has a pair of posts 22, 24 for mounting the head restraint assembly 20 to a vehicle seat back, as is known in the art. The posts 22, 24 can be formed separately or may be formed integrally with a cross-bar connecting the posts. For the depicted embodiment, the posts 22, 24 are formed separately. Although the posts 22, 24 are for mounting to a vehicle seat back, the invention contemplates that the posts 22, 24 may be utilized for mounting at any location on a vehicle body for orienting the head restraint assembly 20 proximate to the vehicle seat back for supporting a head of an occupant.

Figure 2:
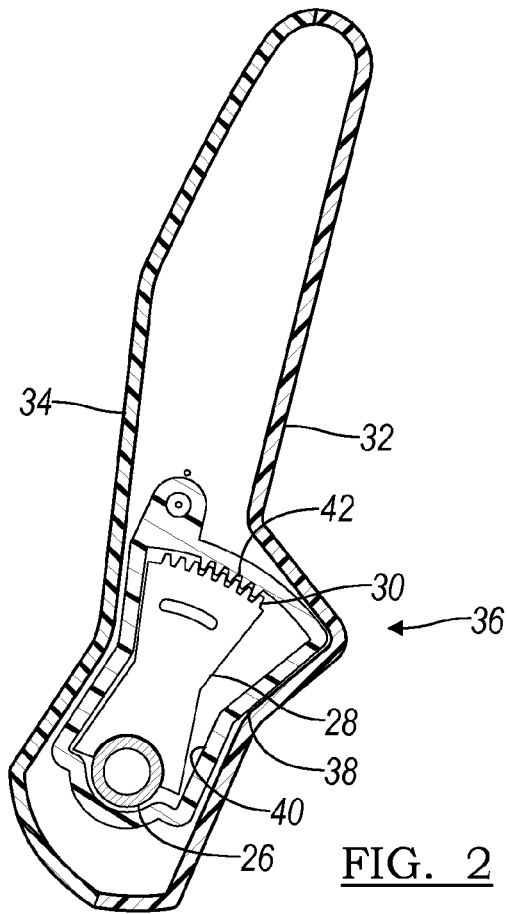
FIG. 2 is a section view of the head restraint assembly of FIG. 1.

Referring now to FIGS. 1 and 2, in at least one embodiment, the proximal ends of the posts 22, 24 are curved and flattened, and are interconnected by a transverse shaft 26. A sector gear 28 is mounted to the transverse shaft 26. The sector gear is fixed to the shaft 26 by welding or any suitable fastener. The sector gear 28 has a series of radially outboard-extending teeth 30. The head restraint assembly 20 includes a rear shell 32 and a front shell 34 for collectively providing the underlying structure for the head restraint assembly 20. The rear and front shells 32, 34 are provided in a two-piece arrangement which enclose the components of the head restraint assembly 20 once assembled and collectively provide a pivotal connection upon the transverse shaft 26.

The head restraint assembly 20 includes a locking mechanism 36 for locking the head restraint and the shells 32, 34 at various angular positions relative to the transverse shaft 26. The locking mechanism 36 includes a slider 38 that is mounted on the transverse shaft 26 for translation upon the transverse shaft 26. As illustrated in FIG. 2, the slider 38 has a cavity 40 formed therein providing a partial ring gear 42 with teeth extending radially inward for engagement with the teeth 30 of the sector gear 28. The cavity 40 is sized to constrain the sector gear 28 within the cavity 40 for limited pivotal movement of the slider 38 relative to the sector gear 28. Likewise, the slider 38 is constrained between the shells 32, 34 for limited transverse translation within the shells 32, 34. Therefore, translation of the slider 38 out of engagement with the sector gear 28 permits limited pivotal adjustment of the slider 38, and consequently, the head restraint shells 32, 34 relative to the transverse shaft 26. Engagement of the slider 38 with the sector gear 28 locks a position of the slider 38 and the shells 32, 34 pivotally relative to the transverse shaft 26. Referring again to FIG. 1, a tension spring 44 is mounted to the slider 38 and the rear shell 32 for biasing the slider 38 into engagement with the sector gear 28 for maintaining the head restraint assembly in a locked pivotal position.

A bushing or sleeve 46 is mounted to the shells 32, 34 for retaining a spring-loaded push rod 48. A bezel 50 is mounted to the bushing 46 on the exterior of the head restraint assembly 20. In other words, foam padding, cushioning, trim material and the like are provided about and supported upon the shells 32, 34. The bezel 50 is provided exterior of these components for covering an aperture provided through these components. A push button 52 extends from the bezel 50 for manual actuation of the push rod 48. The push rod 48 engages the slider 38 so that manual actuation of the push button 52 extends the push rod 48 laterally inward relative to the head restraint assembly 20 thereby sliding the slider 38 out of engagement with the sector gear 28. Once disengaged, the occupant can adjust a tilt of the head restraint, by adjusting a pivotal position of the slider 38 and shells 32, 34 relative to the transverse shaft 26. Release of the manual button 52 results in return of the manual button 52 to a locked position due to a compression spring 54 in the bushing 46. Likewise, the slider 38 is returned to a locked position wherein the partial ring gear 42 engages the teeth 30 of the sector gear 28 due to the return spring 44. The push rod 48 is returned to the unloaded position by the springs 44, 54 thereby returning the slider 38 and push button 52 to the locked position.

A torsion spring 56 is provided on the transverse shaft 26 in engagement with the sector gear 28 and the rear shell 32 for urging the head restraint shells 32, 34 to pivot to a forward-most tilt position when the slider 38 is disengaged from the sector gear 28. A static gear 58 is mounted to the transverse shaft 26. A damping mechanism 60 is mounted to the rear shell 32. The damping mechanism 60 includes a pinion gear in engagement with the static gear 58, as is known in the art, so that rotation of the rear shell 32 relative to the transverse shaft 26 results in rotation of the pinion gear due to engagement with the static gear 58 thereby providing a damping resistance upon the engagement with the static gear 58 for damping the rotation of the shells 32, 34 relative to the transverse shaft 26.

The head restraint assembly 20 permits an occupant to adjust the position with a one-handed operation. The occupant unlocks the head restraint assembly 20 by pressing the button 52, and the torsion spring 56 pivots the head restraint assembly 20 forward until the head restraint assembly 20 reaches a forward-most position or until the travel is interrupted. For example, if the occupant releases the button 52 at an intermediate position, the head restraint assembly 20 is locked at an intermediate position. In another example, if the occupant maintains the depression of the button 52, the head restraint assembly 20 will pivot forward until the head restraint assembly 20 contacts the head of the occupant. Subsequent release of the button 52 locks the head restraint assembly 20 at the selected position. If the occupant would like to adjust the head restraint assembly 20 rearward, the occupant can merely depress the button 52 and lean his/her head against the head restraint assembly 20 until a desired position is obtained, then release the button 52 to lock the position. Unlike traditional head restraints, the occupant is not required to use both hands to push or pull the head restraint assembly 20 to the desired position.

The head restraint assembly 20 provides tilt adjustment of the head restraint and shells 32, 34 relative to the transverse shaft 26 for occupant selected comfort. The locking mechanism 36 employed permits a relatively compact head restraint assembly 20. The torsion spring 56 urges the head restraint and shells 32, 34 to a forward-most tilt position to accommodate the occupant and for providing the head restraint and shells 32, 34 as close to the back of the head of the occupant as permitted for minimizing the space therebetween and enhancing safety.

Figure 3:
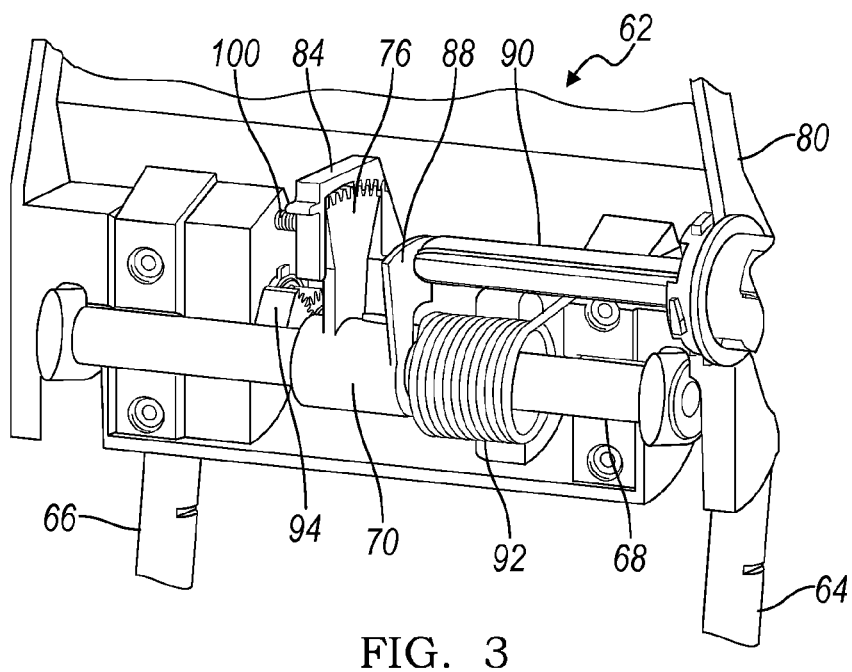
FIG. 3 is a partially disassembled perspective view of another adjustable vehicle head restraint assembly according to another embodiment.
Figure 4:
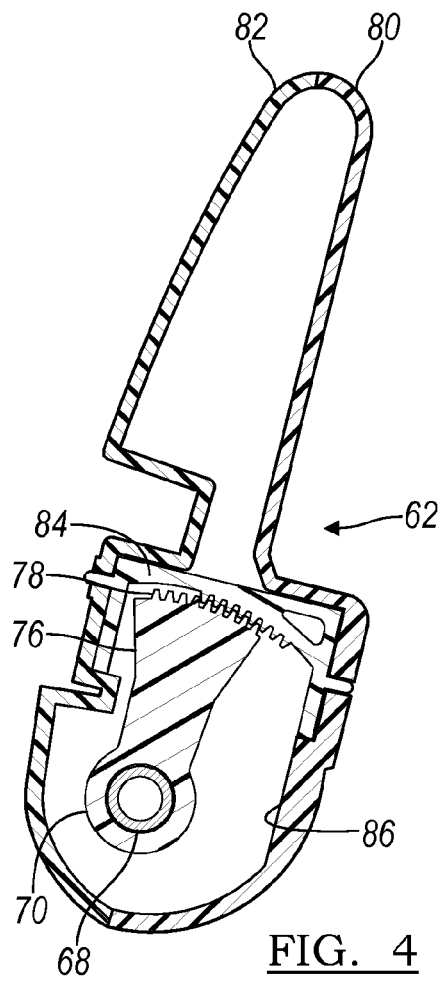
FIG. 4 is a section view of the head restraint assembly of FIG. 3.
Figure 5:
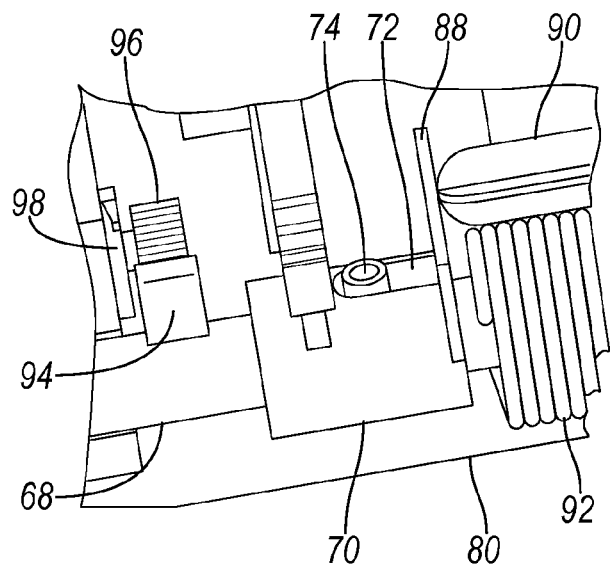
FIG. 5 is an enlarged perspective view of a portion of the head restraint assembly of FIG. 3.

Referring now to FIG. 3, a head restraint assembly 62 is illustrated according to another embodiment. The head restraint assembly 62 includes a pair of posts 64, 66 interconnected by a transverse shaft 68. As illustrated in FIGS. 3-5, a sleeve 70 is mounted on the transverse shaft 68 for translation along the shaft 68. A slot 72 is formed in the sleeve 70 for receiving a pin 74 extending from the transverse shaft 68. The slot 72 and pin 74 cooperate for limiting the sleeve 70 for translation only along the transverse shaft 68. A sector gear 76 is mounted to the sleeve 70 and includes a series of teeth 78 extending radially outboard therefrom.

The head restraint assembly 62 includes a rear shell 80 and a front shell 82 that interconnect to collectively retain the components of the head restraint assembly 62 therein. The shells 80, 82 mate to collectively provide a pivotal connection about the transverse shaft 68. The shells 80, 82 collectively retain a partial ring gear 84 for engagement with the teeth 78 of the sector gear 76. Additionally, the shells 80, 82 collectively provide a cavity 86 for permitting movement of the shells 80, 82 relative to the sector gear 76.

A tab 88 extends from the sleeve 70 for being engaged by a push rod 90. Actuation of the push rod 90 upon the tab 88 translates the sleeve 70 for disengaging the sector gear 76 from the partial ring gear 84 thereby permitting pivotal movement of the head restraint shells 80, 82 relative to the transverse shaft 68. A torsion spring 92 is provided on the transverse shaft 68 and is connected to the shaft 68 and the rear shell 80 for pivoting the head restraint and shells 80, 82 to a forward-most tilt position.

As illustrated in FIGS. 3 and 5, a sector gear 94 is provided on the transverse shaft 68 and engages a pinion gear 96 of a damping mechanism 98. The rotation of the head restraint shells 80, 82 relative to the transverse shaft 68 is damped due to the engagement of the pinion gear 96 with the sector gear 94. FIG. 3 illustrates a compression spring 100 that is provided between the rear shell 80 and the sector gear 76 for urging the sector gear 76 into the locked position.

FIG. 6 illustrates an adjustable vehicle head restraint assembly 102 according to another embodiment. The head restraint assembly 102 includes a pair of posts 104, 106 interconnected by a transverse shaft 108. In FIGS. 6 and 7, a rear shell 110 and a front shell 111 collectively retain the components of the head restraint assembly 102 and are pivotally connected to the transverse shaft 108.

A guide bracket 112 is welded to the transverse shaft 108 and has a cut-out 113 formed therein for receiving a transverse slider 114 as illustrated in FIGS. 6-8. A retainer plate 116 is mounted to the guide bracket 112 to retain the transverse slider 114 within the cut-out 113. The transverse slider 114 includes a pair of angled slots 118, each of which receives a pin 120 therethrough. The pins 120 are also received in longitudinal slots 122 in the retainer plate 116 in the guide bracket 112 for moving up and down within the longitudinal slots 122 as actuated by the angled slots 118 of the transverse slider 114 when the transverse slider 114 is translated. A longitudinal slider 124 is mounted to the pins 120 for being translated towards and away from the transverse shaft 108 dependent upon the position of the transverse slider 114. A partial ring gear 126 is mounted between the shells 110, 111 and has a series of downward extending teeth 128 for receiving the longitudinal slider 124 and locking the head restraint and shells 110, 111 relative to the transverse shaft 108.

A bushing 130 is provided between the shells 110, 111 for supporting a bezel 132 for a push button 134 for actuation of a push rod 136. Depression of the push button 134 actuates the push rod 136 to move the transverse slider 114 transversely. The angled slots 118 drive the pins 120 downward within the longitudinal slots 122 thereby converting the linear motion in a transverse direction to linear motion in a longitudinal direction. As the pins 120 are translated downward, the longitudinal slider 124 is retracted from the teeth 128 of the partial ring gear 126 thereby permitting pivotal adjustment of the head restraint and shells 110, 111 relative to the transverse shaft 108. Similar to prior embodiments, a torsion spring 138 is provided connected to the transverse shaft 108 or the guide bracket 112, and the rear shell 110 of the head restraint for pivoting the head restraint and shells 110, 111 to a forward-most tilt position.

Figure 9:
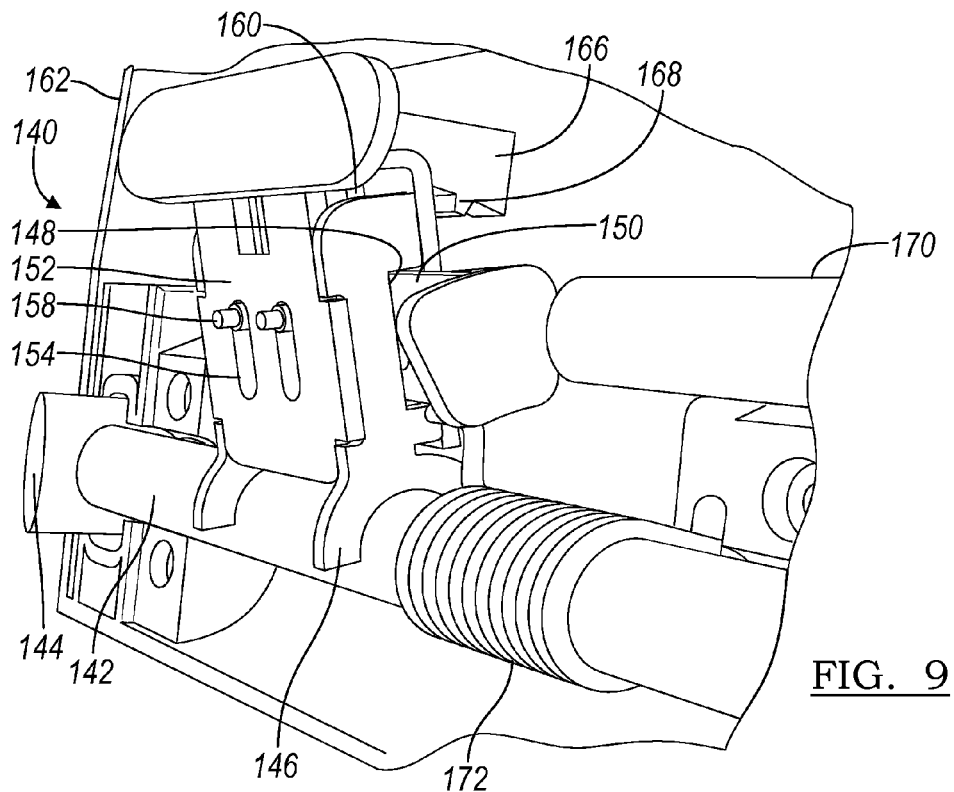
FIG. 9 is a partially disassembled perspective view of an adjustable vehicle head restraint assembly according to another embodiment.
Figure 10:
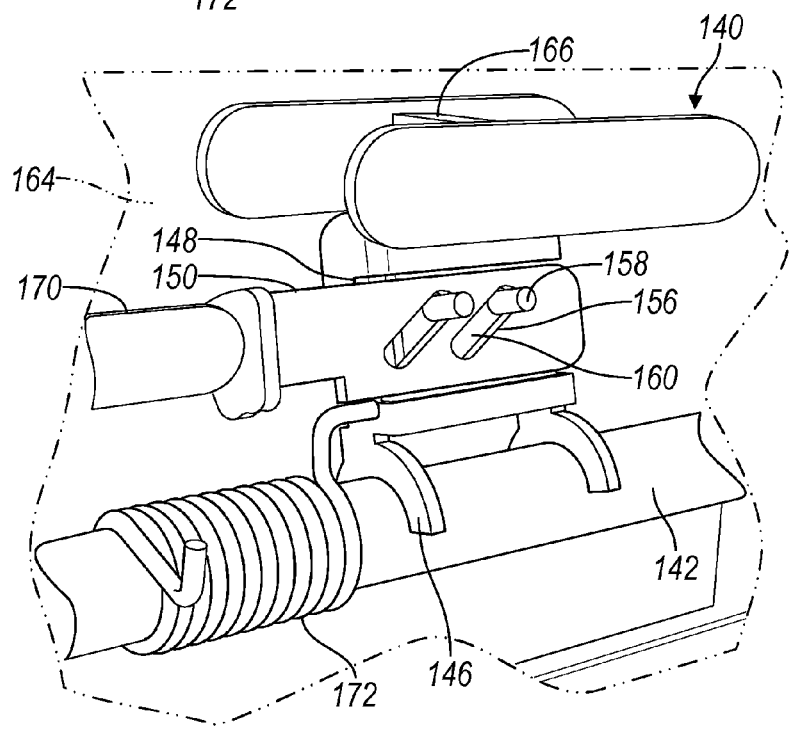
FIG. 10 is another partially disassembled perspective view of the head restraint assembly of FIG. 9.

FIGS. 9 and 10 illustrate another adjustable vehicle head restraint assembly 140 according to another embodiment. The head restraint assembly 140 includes a transverse shaft 142 mounted to a pair of posts 144. A guide bracket 146 is mounted to the transverse shaft 142. A cut-out 148 is provided in the guide bracket 146 for receiving a transverse slider 150.

A retaining bracket 152 is provided over the guide bracket 146 and has a pair of longitudinal slots 154 formed through opposed plates of the bracket 152. The head restraint assembly 140 is illustrated with the retaining bracket 152 removed in FIG. 10 in order to illustrate underlying components.

The transverse slider 150 includes a pair of angled slots 156 for receiving a pair of pins 158 that are also received within the longitudinal slots 154. A longitudinal slider 160 is mounted to the pins such that transverse movement of the transverse slider 150 translates the pins 158 downward within the angled slots 156 and the longitudinal slots 154 thereby retracting the longitudinal slider 160.

A rear shell 162 and a front shell 164 collectively retain the components of the head restraint assembly 140 and are pivotally connected to the transverse shaft 142. The shells 162, 164 support a partial ring gear 166 with radially inward extending teeth 168 for engagement with the longitudinal slider 160. Retraction of the longitudinal slider 160 permits tilt adjustment of the head restraint and front and rear shells 162, 164 about the transverse shaft 142. Extension of the longitudinal slider 160 locks a pivotal position of the head restraint and shells 162, 164. A push rod 170 is manually actuated for actuating the transverse slider 150 for disengaging the longitudinal slider 160 for permitting tilt adjustment. A torsion spring 172 is provided upon the transverse shaft 142 for urging the head restraint and the shells 162, 164 to a forward-most tilt position.

The above-depicted head restraint assembly embodiments provide a compact head restraint that is adjustable to various tilt positions and which resets the head restraint at a forward-most tilt position for comfort and safety.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An adjustable vehicle head restraint assembly comprising:
   at least one post adapted to be mounted in a vehicle proximate to a seat back;
   a transverse shaft mounted to the at least one post;
   a head restraint pivotally connected to the transverse shaft;
   a series of teeth provided on the head restraint;
   a locking mechanism mounted to the transverse shaft for translation in a transverse direction for engagement with the series of teeth; and
   an actuator mounted to the head restraint in cooperation with the locking mechanism such that actuation of the actuator in the transverse direction disengages the locking mechanism from the series of teeth for permitting adjustment of a tilt of the head restraint relative to the transverse shaft;
   wherein the locking mechanism comprises:
      a first slider mounted to the transverse shaft for translation in the transverse direction, the first slider being in cooperation with the actuator, and
      a second slider mounted to the transverse shaft for translation in a direction generally perpendicular to the transverse direction, the second slider being in cooperation with the first slider such that translation of the first slider actuates the second slider for retracting and extending the second slider in order to engage and disengage the second slider with the series of teeth on the head restraint.

2. The head restraint assembly of claim 1 further comprising a biasing member in cooperation with the first slider for maintaining the first slider, and consequently the second slider, in a locked position.

3. The head restraint assembly of claim 2 wherein the biasing member comprises a compression spring.

4. The head restraint assembly of claim 1 wherein the first slider has one of an angled slot formed therein and a pin extending therefrom;
   wherein the second slider has another of the angled slot formed therein and the pin extending therefrom; and
   wherein the pin is received in the angled slot for converting translation of the first slider to translation of the second slider.

5. The head restraint assembly of claim 1 further comprising a biasing member cooperating with the transverse shaft and the head restraint for urging the head restraint to a forward-most tilt position in response to actuation of the actuator.

6. The head restraint assembly of claim 5 wherein the biasing member comprises a torsion spring.

7. The head restraint assembly of claim 1 wherein the series of teeth extend radially toward the transverse shaft.

8. The head restraint of claim 1, wherein the series of teeth pivot with the head restraint relative to the transverse shaft and the locking mechanism to provide a plurality of adjustable tilt orientations of the head restraint.

9. An adjustable vehicle head restraint assembly comprising:
   at least one post adapted to be mounted in a vehicle proximate to a seat back;
   a transverse shaft mounted to the at least one post;
   a head restraint pivotally connected to the transverse shaft;
   a series of teeth provided on the head restraint extending radially toward the transverse shaft;
   a locking mechanism mounted to the transverse shaft for converting translation in a transverse direction to translation in a direction perpendicular to the transverse direction for engagement with the series teeth; and
   an actuator mounted to the head restraint in cooperation with the locking mechanism such that actuation of the actuator in the transverse direction disengages the locking mechanism from the series of teeth for permitting adjustment of a tilt of the head restraint relative to the transverse shaft;
   wherein the locking mechanism comprises:
      a first slider mounted to the transverse shaft for translation in the transverse direction, the first slider being in cooperation with the actuator, and
      a second slider mounted to the transverse shaft for translation in a direction generally perpendicular to the transverse direction, the second slider being in cooperation with the first slider such that translation of the first slider actuates the second slider for retracting and extending the second slider from and into engagement with the series of teeth of the head restraint;
   wherein the first slider has one of an angled slot formed therein and a pin extending therefrom;
   wherein the second slider has another of the angled slot formed therein and the pin extending therefrom; and
   wherein the pin is received in the angled slot for converting translation of the first slider to translation of the second slider.

10. An adjustable vehicle head restraint assembly comprising:
- at least one post adapted to be mounted in a vehicle proximate to a seat back;
- a transverse shaft mounted to the at least one post;
- a head restraint pivotally connected to the transverse shaft;
- a series of teeth provided on the head restraint;
- a locking mechanism mounted to the transverse shaft for translation in a transverse direction for engagement with the series of teeth; and
- an actuator mounted to the head restraint in cooperation with the locking mechanism such that actuation of the actuator in the transverse direction disengages the locking mechanism from the series of teeth for permitting adjustment of a tilt of the head restraint relative to the transverse shaft;
- wherein the series of teeth extend radially toward the transverse shaft; and
- wherein the locking mechanism converts translation in the transverse direction to translation in a perpendicular direction.

11. The head restraint assembly of claim 10 wherein the locking mechanism comprises:
- a first slider mounted to the transverse shaft for translation in the transverse direction, the first slider being in cooperation with the actuator; and
- a second slider mounted to the transverse shaft for translation in a direction generally perpendicular to the transverse direction, the second slider being in cooperation with the first slider such that translation of the first slider actuates the second slider for retracting and extending the second slider in order to engage and disengage the second slider with the series of teeth on the head restraint.

12. The head restraint assembly of claim 11 further comprising a biasing member in cooperation with the first slider for maintaining the first slider, and consequently the second slider, in a locked position.

13. The head restraint assembly of claim 12 wherein the biasing member comprises a compression spring.

14. The head restraint assembly of claim 11 wherein the first slider has one of an angled slot formed therein and a pin extending therefrom;
- wherein the second slider has another of the angled slot formed therein and the pin extending therefrom; and
- wherein the pin is received in the angled slot for converting translation of the first slider to translation of the second slider.

15. The head restraint assembly of claim 10 further comprising a biasing member cooperating with the transverse shaft and the head restraint for urging the head restraint to a forward-most tilt position in response to actuation of the actuator.

16. The head restraint assembly of claim 15 wherein the biasing member comprises a torsion spring.

17. The head restraint of claim 10, wherein the series of teeth pivot with the head restraint relative to the transverse shaft and the locking mechanism to provide a plurality of adjustable tilt orientations of the head restraint.

\* \* \* \* \*